United States Patent
Bowe et al.

(10) Patent No.: US 12,194,796 B2
(45) Date of Patent: Jan. 14, 2025

(54) QUICK MOUNT HITCH CONNECTION

(71) Applicant: Curt Manufacturing, LLC, Eau Claire, WI (US)

(72) Inventors: Curtis M. Bowe, Chippewa Falls, WI (US); Brandon A. Knuth, Eau Claire, WI (US); Joel D. Diller, Eau Claire, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 586 days.

(21) Appl. No.: 17/535,092

(22) Filed: Nov. 24, 2021

(65) Prior Publication Data

US 2022/0161617 A1 May 26, 2022

Related U.S. Application Data

(60) Provisional application No. 63/117,746, filed on Nov. 24, 2020.

(51) Int. Cl.
*B60D 1/52* (2006.01)
*B60D 1/04* (2006.01)
*B60D 1/36* (2006.01)

(52) U.S. Cl.
CPC ................ *B60D 1/52* (2013.01); *B60D 1/04* (2013.01); *B60D 1/36* (2013.01)

(58) Field of Classification Search
CPC ............................ B60D 1/52; B60D 2001/544
See application file for complete search history.

(56) References Cited

U.S. PATENT DOCUMENTS

| | | | |
|---|---|---|---|
| 4,746,138 A | 5/1988 | James | |
| 4,971,237 A | 11/1990 | Davis | |
| 5,303,857 A | 4/1994 | Hewson | |
| 5,549,316 A | 8/1996 | Jones | |
| 5,593,172 A | 1/1997 | Breslin | |
| 5,640,949 A | 6/1997 | Smith | |
| 5,685,469 A * | 11/1997 | Stapleton | B60R 9/10 224/536 |
| 5,735,539 A | 4/1998 | Kravitz | |
| 6,062,451 A | 5/2000 | Lassanske et al. | |
| 6,145,720 A | 11/2000 | Comeau | |
| 6,401,999 B1 | 6/2002 | Hehr | |

(Continued)

*Primary Examiner* — Anne Marie M Boehler
*Assistant Examiner* — Hosam Shabara
(74) *Attorney, Agent, or Firm* — Shewchuk IP Services, LLC; Jeffrey D. Shewchuk

(57) ABSTRACT

A quick mount hitch connection for supports a towing accessory from a towing vehicle. An accessory shank is received within a sloped channel structure rising upwardly and rearwardly from horizontal. One of the faces defining the channel is open. A pivot bearing is provided along a bottom of the channel, such as by a pivot bar supported by the side walls of the channel structure and extending into the channel. A securing connector is provided at a location spaced from the pivot bearing, which can be removably fastened to simultaneously hold the accessory shank against the pivot bearing and to prevent the accessory shank from pivoting in the channel. The connection allows quick attachment, quick lowering, and changing the accessory from a usage position to a stowage position all by hand and without any tools.

20 Claims, 10 Drawing Sheets

(56) References Cited

U.S. PATENT DOCUMENTS

| | | | |
|---|---|---|---|
| 6,460,745 B1 * | 10/2002 | Weaver | B60R 9/06 |
| | | | 224/519 |
| D466,844 S | 12/2002 | Billings | |
| D469,723 S | 2/2003 | McCoy et al. | |
| 6,536,794 B2 | 3/2003 | Hancock et al. | |
| 6,547,116 B2 | 4/2003 | Anderson et al. | |
| 6,581,952 B1 | 6/2003 | MacKarvich | |
| 6,604,658 B1 * | 8/2003 | Young | B60R 9/06 |
| | | | 224/523 |
| 6,709,002 B2 | 3/2004 | Tambornino | |
| D519,065 S | 4/2006 | Tambornino | |
| 7,195,269 B2 | 3/2007 | Tambornino | |
| 7,240,816 B2 | 7/2007 | Tsai | |
| D610,051 S | 2/2010 | Tambornino | |
| D610,492 S | 2/2010 | Tambornino | |
| D610,493 S | 2/2010 | Tamborino | |
| D610,494 S | 2/2010 | Tambornino | |
| D610,954 S | 3/2010 | Tambornino | |
| D623,564 S | 9/2010 | Tambornino | |
| 7,914,060 B2 | 3/2011 | Scribner et al. | |
| 8,070,028 B2 | 12/2011 | Segeren et al. | |
| 8,235,268 B2 | 8/2012 | Sautter et al. | |
| 8,251,265 B2 | 8/2012 | Grudek | |
| 9,254,790 B2 | 2/2016 | Dreger et al. | |
| 9,308,789 B2 | 4/2016 | Bernart et al. | |
| 10,106,001 B2 | 10/2018 | Bernart et al. | |
| 10,946,805 B2 | 3/2021 | Skoff | |
| 11,040,668 B2 | 6/2021 | Schmidt | |
| 2005/0023315 A1 | 2/2005 | Skinner | |

\* cited by examiner

QUICK MOUNT HITCH CONNECTION

CROSS-REFERENCE TO RELATED APPLICATION(S)

The present application claims priority from U.S. Provisional Application No. 63/117,746 entitled QUICK MOUNT HITCH CONNECTION filed Nov. 24, 2020, incorporated herein by reference.

BACKGROUND OF THE INVENTION

The present application relates to towing, and particularly for supporting towing balls, ball mounts or other towing accessories supported off the back of the towing vehicle above the road. Typical towing balls and ball mounts which can be modified to be usable with the present invention are shown in U.S. Pat. Nos. 4,746,138, 5,549,316, 5,735,539, 6,536,794, 6,581,952, 6,709,002, 7,195,269, 9,308,789, 10,106,001, D466,844, D469,723, D519,065, D610,492, D610,493, D610,954, D623,564, D610,051, D610,494, all incorporated by reference. Typical accessories usable with the present invention include modified versions of bike racks (examples shown in U.S. Pat. Nos. 6,062,451, 6,547,116, 7,240,816, 8,235,268 and 9,254,790, incorporated by reference), cargo carriers (examples shown in U.S. Pat. Nos. 6,145,720 and 11,040,668, incorporated by reference), bed extenders (examples shown in U.S. Pat. Nos. 7,914,060 and 8,070,028, incorporated by reference), kayak/canoe/surfboard/ladder/lumber racks (example shown in U.S. Pat. No. 10,946,805, incorporated by reference), barbecue grills (example shown in U.S. Pat. No. 5,640,949, incorporated by reference), etc. All of these existing products have a shank (also referred to as a drawbar) received in a square (in vertical, transverse cross-section), longitudinally-extending receiver tube of a receiver hitch as commonly known, such as a 2×2 inch (51×51 mm) receiver tube opening. The shank is then held into the receiver tube by transversely inserting a hitch pin through aligned holes in the receiver tube and the shank. The hitch pin can be held in place such as with a cotter pin clip.

While direct use of such square, longitudinally-extending receiver tubes has been widely accepted in the marketplace, there are several shortcomings. Firstly, the longitudinal direction of insertion usually requires the user to achieve alignment between the accessory and the receiver tube opening and then sliding in the longitudinal direction while lifting the entire weight of the accessory. The receiver tube is typically only about 12 inches above pavement level, far beneath the user's line of vision, making such alignment difficult, particularly while straining to hold the weight of the accessory. Many accessories extend upwardly above the receiver tube height, interfering with the arc of motion of a tailgate or hatch unless the accessory is once again removed from the receiver tube. Alternative positioning options for the accessory, such as between a use position and a stowage position, can be difficult or impossible. Even though many vehicles are equipped with square, longitudinally extending receiver tubes, better solutions are needed.

BRIEF SUMMARY OF THE INVENTION

The present invention is a quick mount hitch connection for supporting a towing accessory from a towing vehicle. The connection can be provided by cooperating portions of a hitch and an accessory shank, but more preferably are provided by a quick mount adapter in conjunction with the accessory shank. The connection includes a channel structure with side walls defining a channel with a channel axis which is sloped relative to both vertical and horizontal, such as at an angle in the range of 30-60° from horizontal rising upwardly and rearwardly. One of the faces defining the channel is open. A pivot bearing is provided along a bottom of the channel, such as by a pivot bar supported by the side walls and extending into the channel. The shank of the accessory has an insert end sized received within the channel, so the accessory can be placed into the channel and then have at least part of its weight be supported by the pivot bearing while permitting pivoting of the accessory shank through the open face. A securing connector is provided at a location spaced from the pivot bearing, which can be removably fastened to simultaneously hold the accessory shank against the pivot bearing and to prevent the accessory shank from pivoting in the channel. The connection preferably allows quick lowering, by pivoting of the accessory shank about the pivot bearing, of the accessory, allowing better and less impeded access to the rear of the towing vehicle such as to open a tailgate, trunk or hatchback. The connection also preferably allows the accessory to be flipped 180° about the axis of the accessory shank, from an accessory usage position to an accessory stowage position, both with the accessory supported above the pavement and behind the towing vehicle. The quick attachment, the quick lowering, and changing from the usage position to the stowage position are preferably all achievable by hand and without any tools.

Figure 1:
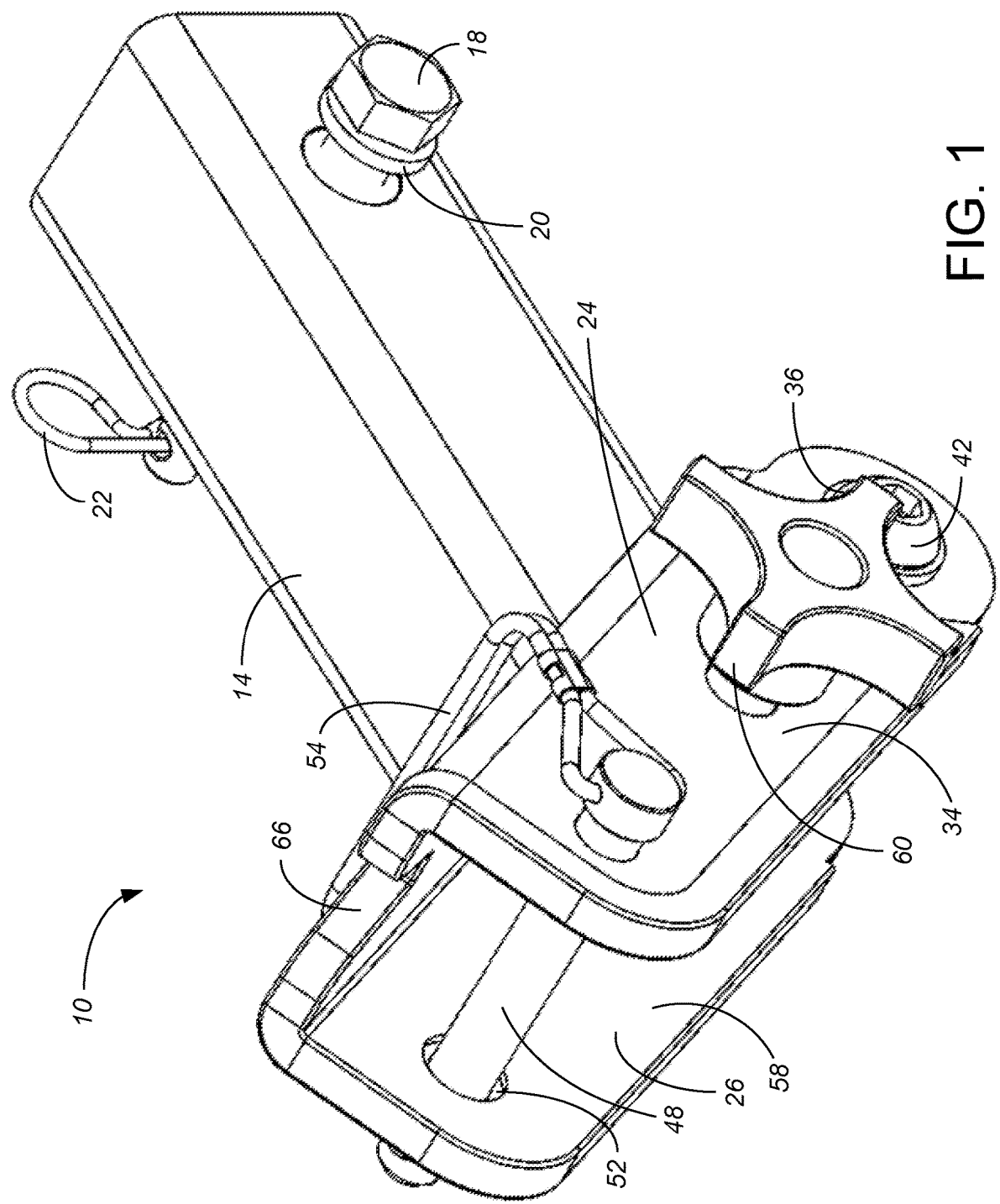
FIG. 1 is a perspective view, from the upper-rear-right, of a first preferred assembled embodiment of a quick mount adapter in accordance with the present invention.
Figure 2:
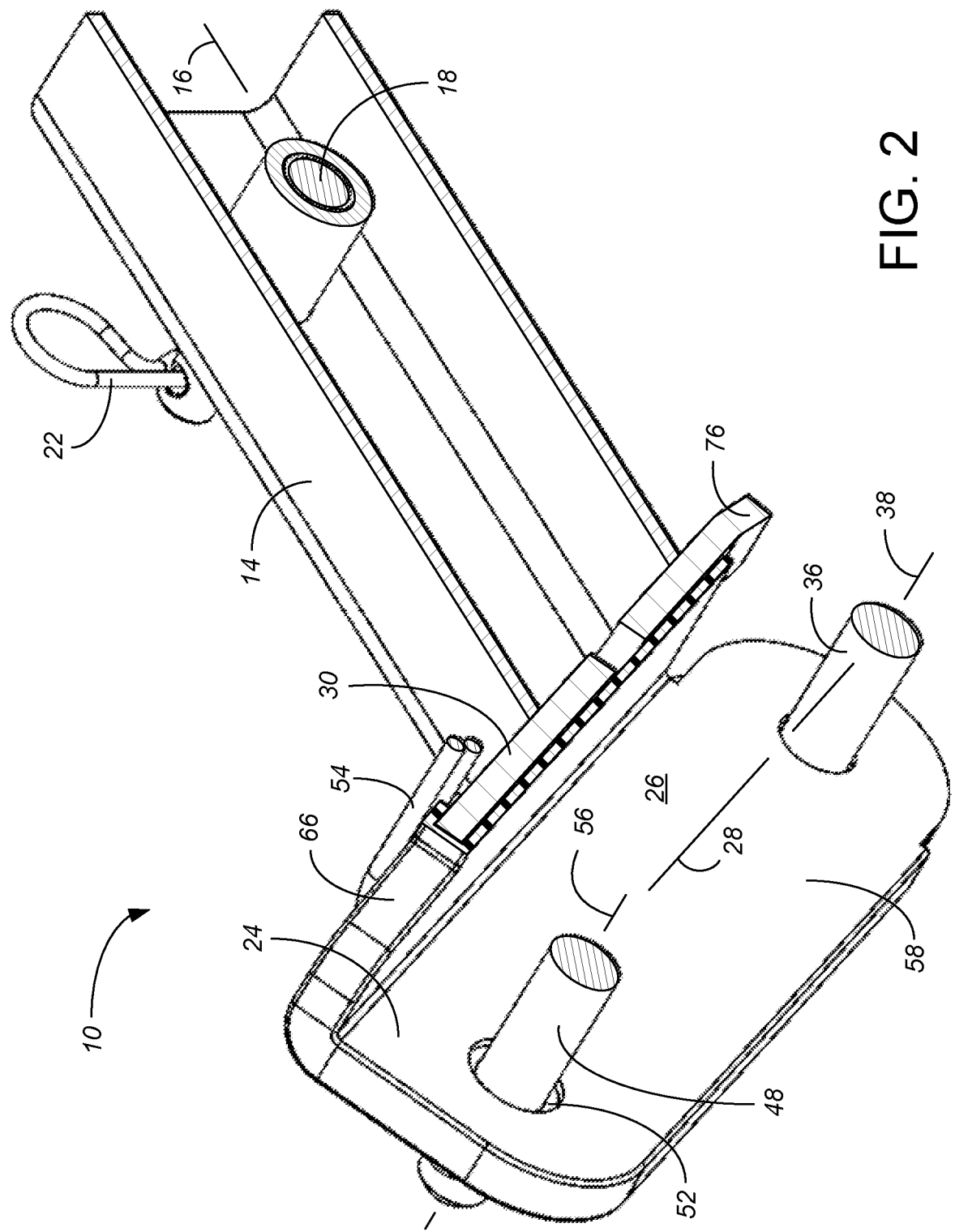
FIG. 2 is the same perspective view as FIG. 1, but in cross-section with a cut line taken vertically on the longitudinal axis of the quick mount adapter.
Figure 3:
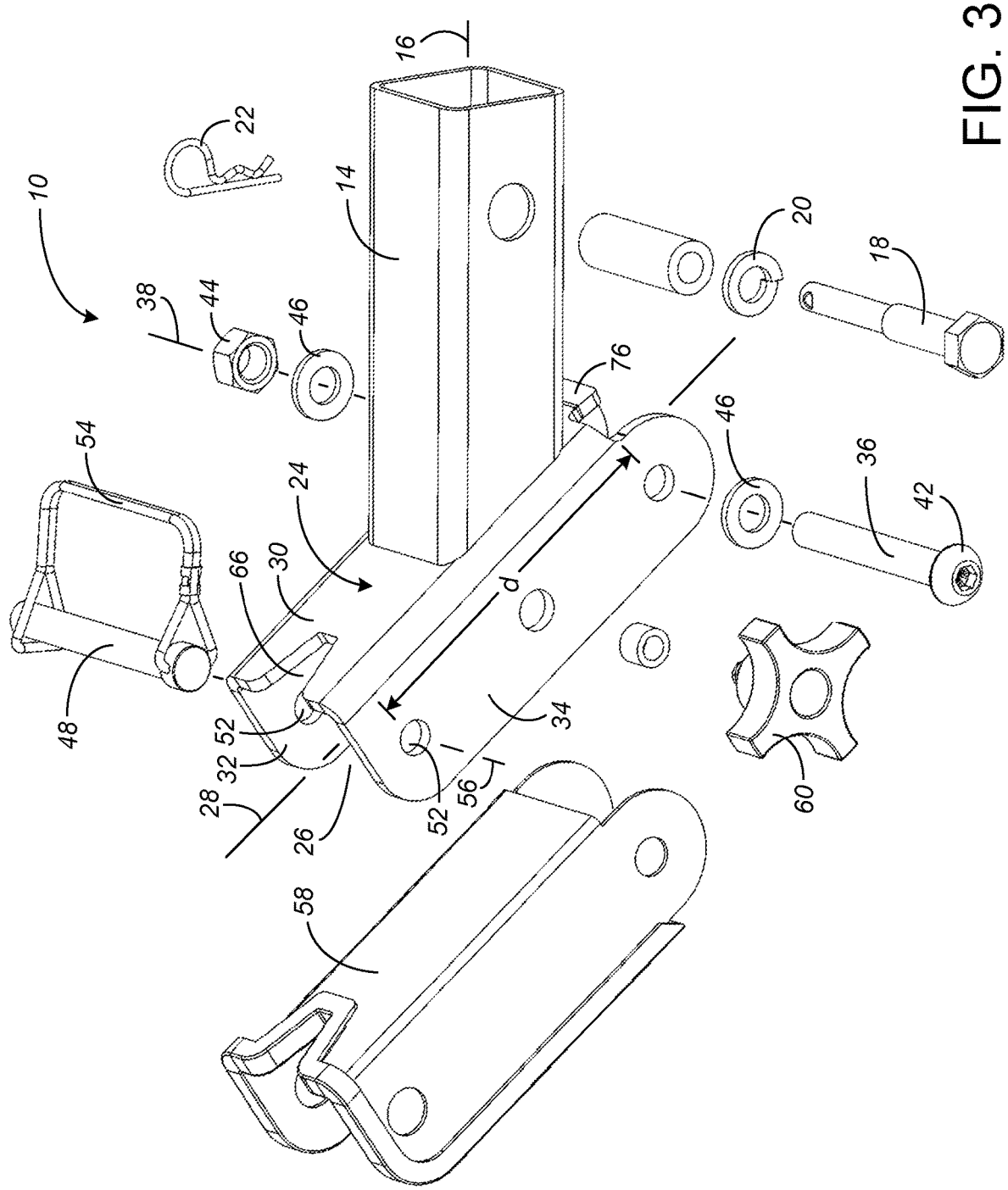
FIG. 3 is an exploded perspective view of the quick mount adapter of FIGS. 1 and 2.
Figure 4:
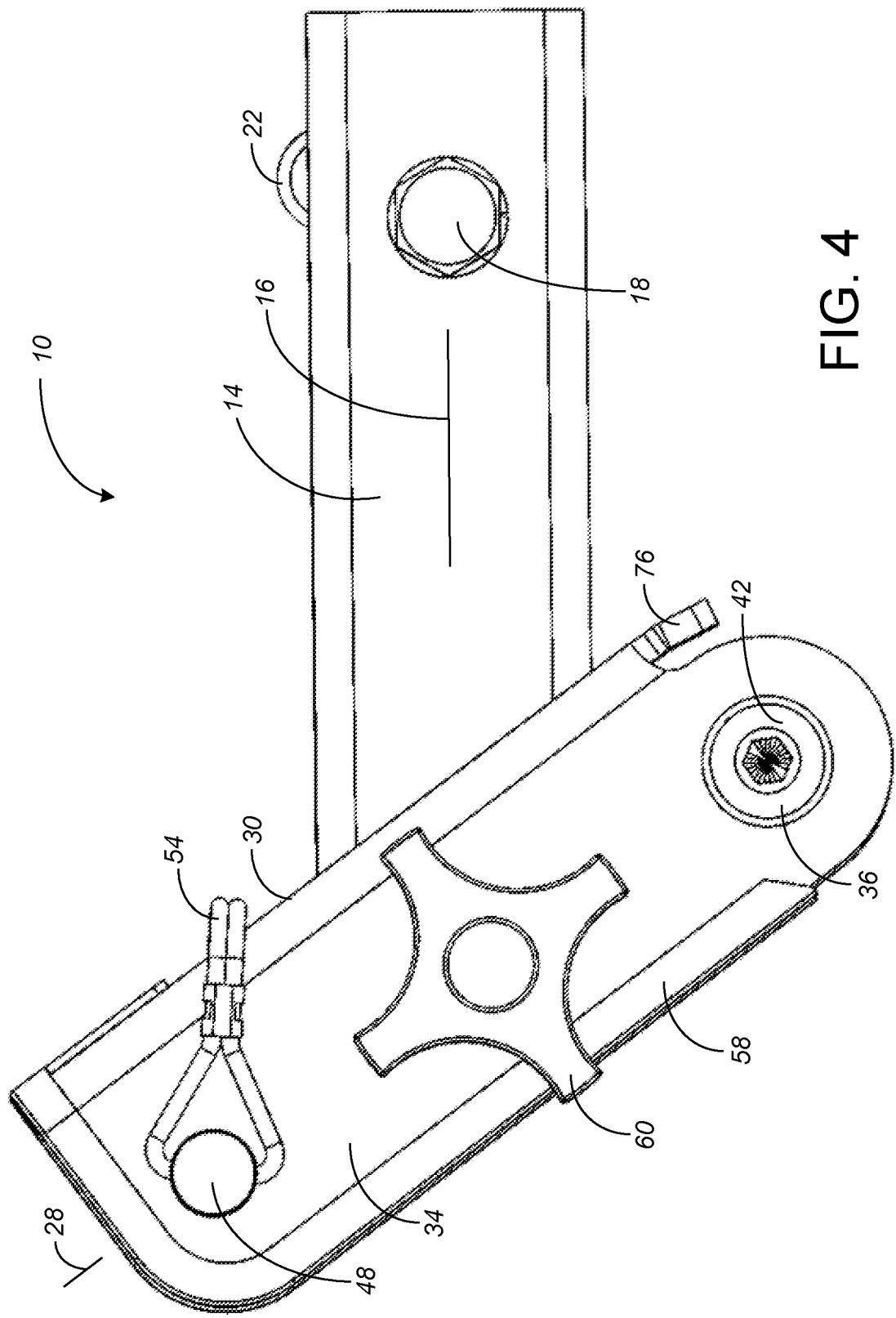
FIG. 4 is a side elevational view of the quick mount adapter of FIGS. 1-3.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

FIGS. 1-12 all show a quick mount adapter 10 in accordance with a preferred embodiment of the present invention, for use with the well-known square, longitudinally extending receiver tube 12 (shown in part in FIGS. 8-11) on a hitch of a towing vehicle. On its leading end ("leading", "trailing", "front", "rear", "left" and "right" being defined in accordance with the direction of vehicle travel during use when mounted on the back of the vehicle), the quick mount adapter 10 includes a shank 14, substantially identical to the prior art shanks, for horizontal insertion forwardly into the longitudinally-extending receiver tube 12.

The shank 14 defines a longitudinal axis 16 which when is use is coincident with the longitudinal axis defined by the receiver tube 12, i.e., generally horizontal and in the fore-aft direction based on how the hitch is mounted and oriented on the towing vehicle. As one example, anti-rattle hardware including a bolt 18, spring washer 20 and cotter pin 22, can be used to secure the shank 14 within a longitudinally-extending receiver tube 12. While the preferred embodiment shown uses a shank 14 with about 2×2 inch (51×51 mm) outer dimensions, other embodiments use 1¼×1¼ inch (32×32 mm) shanks or 2½×2½ inch (63×63 mm) shanks, to match and mate into commonly used receiver tubes.

On its trailing end, the quick mount adapter 10 includes a channel structure 24 defining a channel 26. The channel 26 has a channel axis 28 angled relative to the shank axis 16 with an angle θ called out in FIG. 6. The angle θ must be greater than 0 and less than 90°, i.e., the channel axis 28 is sloped relative to both vertical and horizontal, extending rearwardly and upwardly. For instance, this angle θ should be between 10 and 80°, and more preferably between 30 and 60°. In the preferred embodiment shown, the angle θ between the channel axis 28 and the shank axis 16 is 54°. The channel 26 is preferably defined by a channel structure 24 having a top wall 30 extending from a left side wall 32 to a right side wall 34, but with an opened bottom face between the side walls 32, 34. As one alternative, the channel structure could have left, right and bottom walls, with an opened top face. As another alternative, the channel could be defined on the shank of the accessory, with the trailing end of the quick mount adapter being positioned within the accessory shank. One important consideration with that when the accessory is assembled to the quick mount adapter, the accessory shank is neither horizontal nor vertical, but rather extends at the angle θ.

The shank 14 is preferably formed from a metal tube, and the channel structure 24 is preferably formed by bending of a metal plate to define the top wall 30 and side walls 32, 34, with the channel structure 24 and metal tube 14 being welded together. In the preferred embodiment, both the shank 14 and the channel structure 24 are formed of steel at a thickness in the range of about ¼-⅜ inches (6-10 mm).

A pivot bar 36 is provided at a lower elevation extending into the channel 26. The pivot bar 36 establishes a pivot axis 38, which is preferably transverse to the longitudinal shank axis 16. The open face allows pivoting of the accessory 40 about the pivot axis 38, with at least part of the accessory shank outside of the channel 26. In the preferred embodiment, the pivot is a pivot bolt 36, with a head 42 on one side and secured with a nut 44 on rotational threads on the other side, with washers 46 optionally used to spread the thread tension forces on the side walls 32, 34. The head 42 and nut 44 preferably allow tool tightening during manufacturing assembly of the quick mount adapter 10, such as with an Allen-wrench recess together with a hexagonal outer shape of the nut 44. The use of a pivot bolt 36 makes for an easily assembled, low cost quick mount. Alternatively, the pivot bar could be one bar or two stubs which are welded to or otherwise attached to project into the channel 26 from the side walls 32, 34. The pivot bar 36 needs to be sufficiently strong so as to support the full weight of any and all accessories 40 which can be towed using the quick mount connection. For instance, the preferred embodiment uses a steel pivot bolt 36 with a diameter in the range of ½-⅝ inches (12-16 mm).

An easily-releasable securing connector 48 is positioned at a higher elevation than the pivot axis 38 and spaced by a distance d from the pivot axis 38. The securing connector 48 releasably attaches a shank 50 of the accessory 40 relative to the quick mount adapter 10. The preferred securing connector is a transversely oriented hitch pin 48 which is hand positionable through two hitch pin openings 52 in the side walls 32, 34, so the hitch pin 48 extends across the channel 26. The hitch pin 48 has a hand-bendable hitch pin clip 54 which prevents the hitch pin 48 from inadvertently falling out of the hitch pin openings 52 during towing use. In the preferred embodiment, both the pivot axis 38 and the axis 56 of the hitch pin 48 intersect the channel axis 28, so the angle θ is also defined by the orientation of the pivot axis 38 and hitch pin axis 56 relative to horizontal (which is defined by the shank axis 16), with the pivot axis 38 being forward and below the hitch pin axis 56. In the preferred embodiment shown, the plane of the top wall 30 matches the orientation of the pivot axis 38 relative to the hitch pin axis 56, both at a 54° angle θ relative to the horizontal shank 14. The hitch pin 48 should be sufficiently strong so as to support any moments and forces the accessory 40 places on it while the accessory 40 is towed across bumpy roads and up and down hills and around corners. For instance, the preferred embodiment uses a steel hitch pin 48 with a diameter which matches the diameter of the pivot bolt 36, i.e., a diameter in the range of ½-⅝ inches (12-16 mm). The preferred embodiment uses a distance d of about 5 inches (130 mm) to withstand the moments placed on the accessory shank 50 during towing as the vehicle accelerates, decelerates and turns and bounces in different directions.

One or more optional inserts 58 can be used covering the channel side of the top wall 30 and the side walls 32, 34. Such insert(s) 58 can be molded of a plastic material, softer than the metal used for the channel structure 24 and accessory shank 50. The plastic insert 58 prevents metal to metal contact between the channel structure 24 and the accessory shank 50, leading to a product which is less likely to rattle during use.

For further tightening and rattle prevention, an optional handwheel 60 may be threaded into one of the side walls 32, 34, with an end which can be advanced slightly to push the side of the insert 58 into the channel 26. Tightening of the handwheel 60 helps to eliminate side to side movement between the accessory shank 50 and the channel structure 24. In the preferred embodiment, the handle or knob of the handwheel 60 is also molded from a plastic material. Other tightening or rattle reducing mechanisms could alternatively be used.

Figure 6:
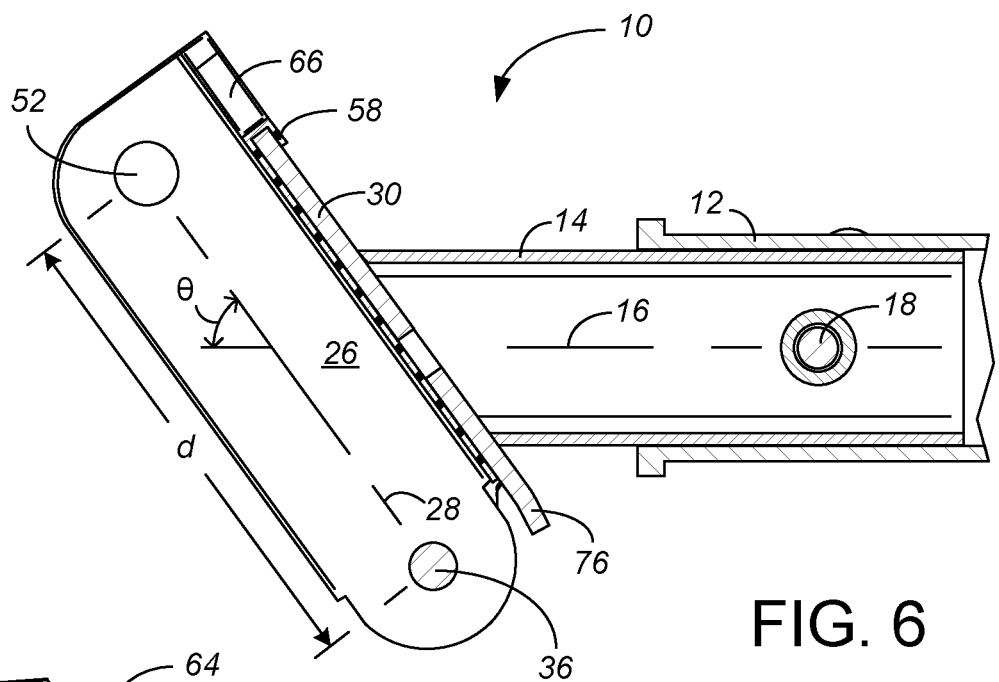
FIG. 6 is a side cross-sectional view, from a cut line taken vertically on the longitudinal axis, of the quick mount adapter of FIG. 1-5 assembled into the receiver hitch.
Figure 7:
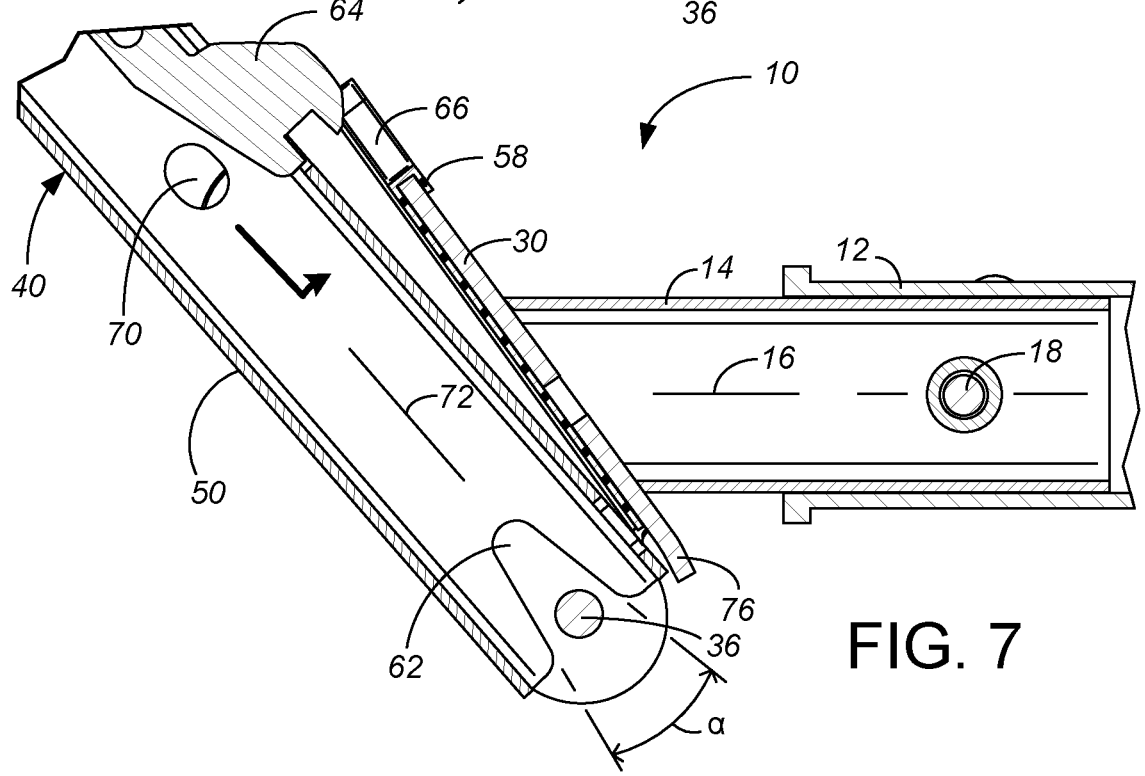
FIG. 7 is a side cross-section view, similar to FIG. 6, but showing an intermediate step in attachment of an accessory using the quick mount adapter of FIG. 1-6.
Figure 8:
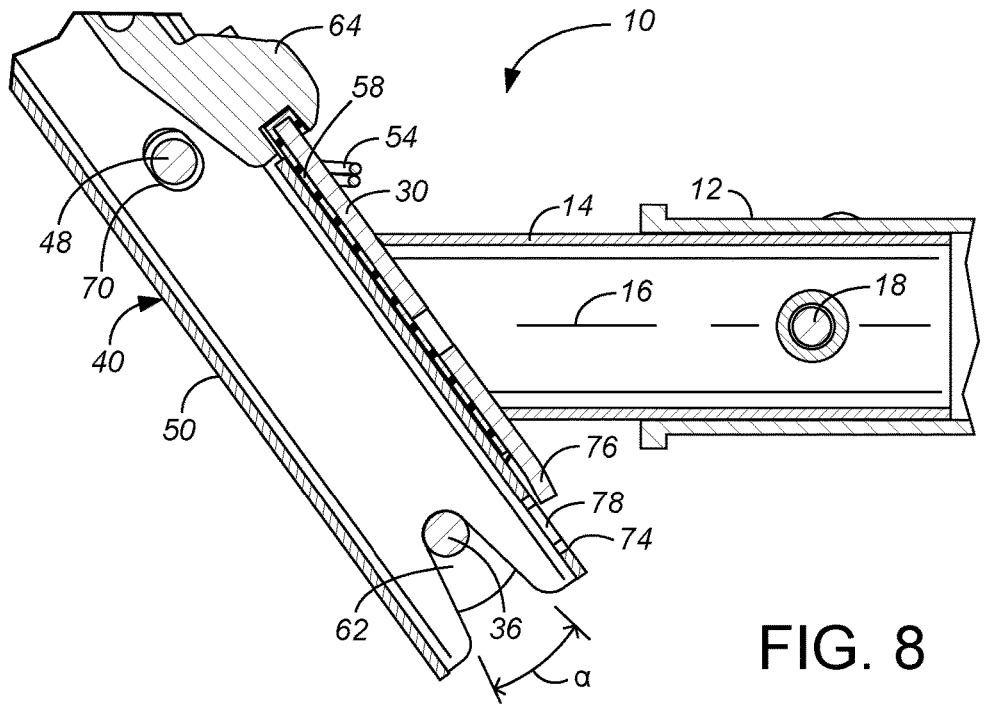
FIG. 8 is a side cross-section view, similar to FIGS. 6 and 7, showing completed attachment of an accessory using the quick mount adapter of FIG. 1-6 to form a quick mount hitch connection in accordance with the present invention.

The attachment method between the accessory 40 and the quick mount adapter 10 is depicted in FIGS. 6-8. The shank 50 of the accessory 40 is preferably formed from a rectangular tube, and has an insert end which fits into the channel 26. The accessory shank 50 is inserted at a downward angle, matching or slightly lower than the angle θ of the channel 26. The accessory shank 50 includes two support recesses 62 along its leading end which are placed downwardly over and receive the pivot bolt 36 as a pivot bearing. The preferred support recesses 62 have a widening mouth, such as at a 20° widening angle α, which assists the user in aligning the accessory shank 50 over the pivot bolt 36. Once the accessory 40 is fully lowered with the pivot bolt 36 contacting the tops of the recesses 62, the pivot bolt 36 thereafter supports a majority or all of the weight of the accessory 40, while still permitting pivoting of the accessory shank 50 through the open face.

As best shown in FIGS. 7 and 8, a spring loaded latch bar 64 may be included within the accessory shank 50, possibly located for use in conjunction with a slot 66 in the top wall 30 of the quick mount adapter 10. Once the accessory 40 is fully lowered with the pivot bolt 36 contacting the tops of the recesses 62, the accessory 40 is pivoted upward about the pivot axis 38 until the latch 64 clicks over the top wall 30, temporarily holding the accessory 40 in place against gravity and temporarily preventing the accessory shank 50 from rotating downward until the latch bar handle 68 is released.

The accessory shank 50 includes two securing connector openings 70, preferably oblong holes, spaced from the recesses 62 with a spacing that generally matches the distance d between the pivot axis 38 and the hitch pin openings 52. Placement of the accessory recesses 62 onto the pivot bar 36 aligns the accessory's holes 70 for the securing connector 48 with the adapter's holes 52 for the securing connector 48. The user then removably inserts the hitch pin 48 into the aligned holes 52, 70 of the quick mount adapter 10 and accessory shank 50. Once fastened in place, the hitch pin 48 causes the pivot bar 36 to be retained within the support recess 62 and simultaneously aligns and maintains the accessory shank axis 72 coincident with the channel axis 28.

The latch 64 helps make it easier for the user to insert the hitch pin 48 into the aligned holes 52, 70 of the quick mount adapter 10 and accessory shank 50 without having to support any of the weight of the accessory 40. However, particularly for lighter weight and smaller accessories like towing balls or ball mounts, the latch 64 can be omitted with the user merely using one hand to hold the accessory shank 50 to align the holes and using the other hand to insert the hitch pin 48 into the aligned holes 52, 70. The oblong shape of the hitch pin holes 70 through the accessory shank 50 allows for easier insertion of the hitch pin 48 even if the user doesn't attain entirely correct positioning of the accessory 40 on the pivot bar 36, as well as accounting for manufacturing tolerances and cases where the accessory shank 50 may be been slightly deformed over years of rough handling and use and potential corrosion.

After the accessory shank 50 has been fully inserted into the channel 26 and the hitch pin 48 has been transversely inserted into the aligned openings 52, 70 in the sides of the accessory shank 50 and the side walls 32, 34 of the quick mount adapter 10, the handwheel 60 is tightened to prevent rattling. Note that rattling could otherwise be significant, particularly if the hitch pin 48 does not fit tightly within either the holes 70 through the accessory shank 50, the holes 52 through the side walls 32, 34 of the channel structure 24, or both. With the accessory 40 fully in position as shown in FIG. 8, the accessory 40 is ready for towing.

Figure 9:
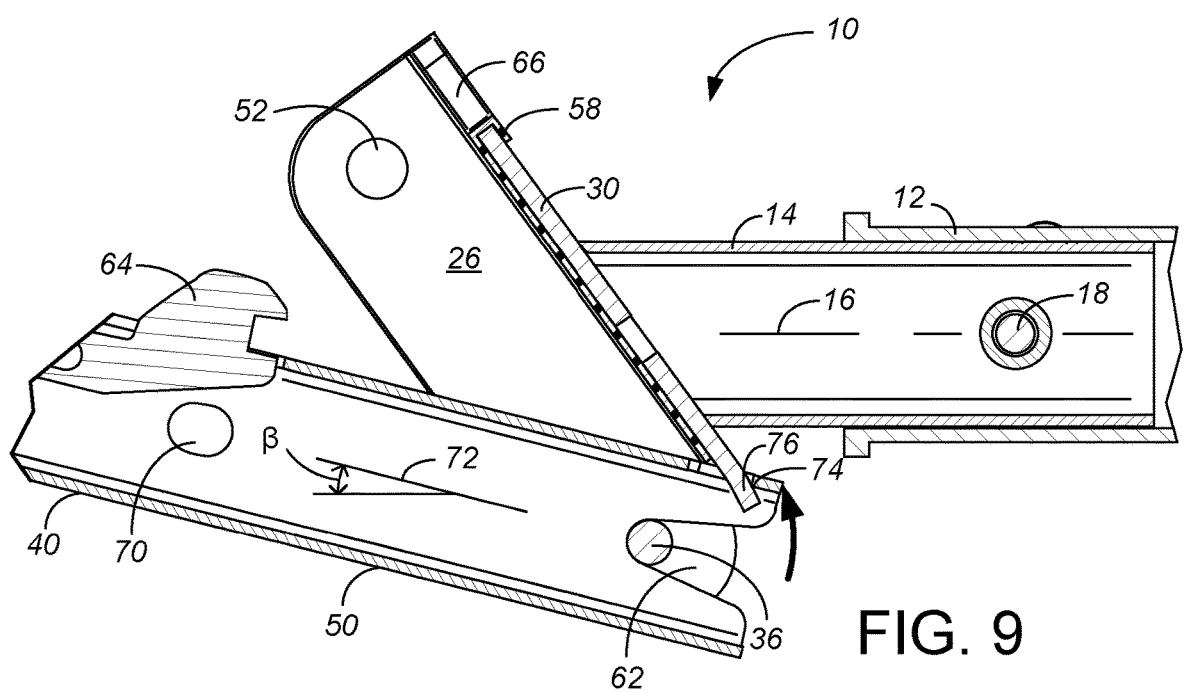
FIG. 9 is a side cross-section view, similar to FIGS. 6-8, showing pivotal lowering of the accessory using the quick mount adapter of FIG. 1-6 to a tailgate or hatchback access position.

FIG. 9 shows how the accessory shank 50 can be pivoted relative to the pivot bolt 36, once the hitch pin 48 is withdrawn and the handwheel 60 and the latch bar handle 68 are released. The accessory 40 can be pivoted to a position where it is laid down, giving more access to the rear of the towing vehicle (such as through a tailgate, hatchback or trunk of the towing vehicle). The accessory shank 50 preferably has a stop 74 which, after a certain amount of pivoting, comes into contact with the channel structure 24 to limit a range of gravitational pivoting of the accessory shank 50 with respect to the channel structure 24 while the securing connector 48 is not in place. For instance, the stop 74 in the preferred embodiment contacts the channel structure 24 when the accessory shank axis 72 is at an angle β (called out in FIG. 9) of about 14°, i.e., the stop 74 allows a downward pivoting of the accessory 40 about the pivot axis 38 of at most about 40°. The quick mount adapter 10 can thus be used to support the towing accessory 40 from the towing vehicle in either of two rest positions: a first rest position shown in FIG. 8 where the accessory shank axis 72 is coincident with the channel axis 28, and a second rest position shown in FIG. 9 with the accessory shank 50 extending through the open face.

After the user is finished accessing the rear of the towing vehicle, the accessory 40 then can be merely rotated upward back to its towing position, pivoting about the pivot bolt 36, with the hitch pin 48 thereafter reinserted. Prior art hitch attachments into the horizontal receiver tube did not allow this ease of access to the rear of the vehicle.

Figure 5:
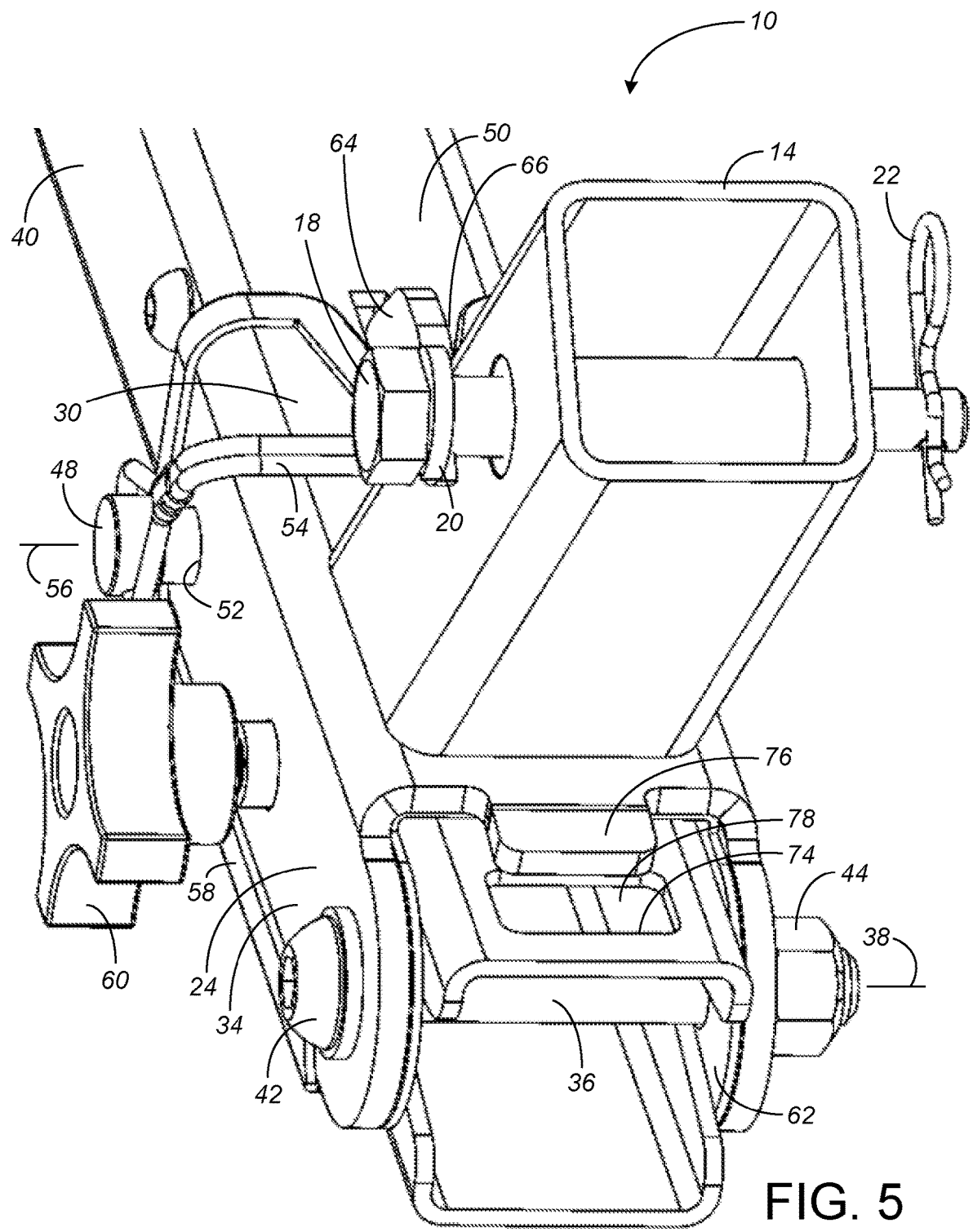
FIG. 5 is a perspective view, from the lower-front-right, of the quick mount adapter of FIGS. 1-4.

As an optional further attachment mechanism, as best shown in FIGS. 5 and 9, the preferred embodiment has a tab 76 on the leading end of the top wall 30 which mates into a slot 78 on the top, leading end of the accessory shank 50. When the accessory shank 50 is pivoted downward, the tab 76 engages within the slot 78 and prevents disengagement of the accessory shank 50 from the pivot bolt 36. Due to the interaction between the slot 78 and the tab 76, the accessory shank 50 can only be removed from the channel 26 by pulling upwardly (in a direction along the accessory shank axis 72) on the accessory 40 with a force that exceeds the weight of the accessory 40 and while the accessory shank axis 72 generally aligned with the channel axis 28.

As alternative quick mount constructions, instead of using an adapter with its shank being removably inserted into the receiver tube of a hitch, the quick mount connection of the invention could be integral with and permanently attached to the hitch, such as by welding the shank 14 to the hitch crossbar (not shown). Workers skilled in the art will further appreciate that there are many other ways to attach the quick mount of the present invention to the towing vehicle.

Figure 10:
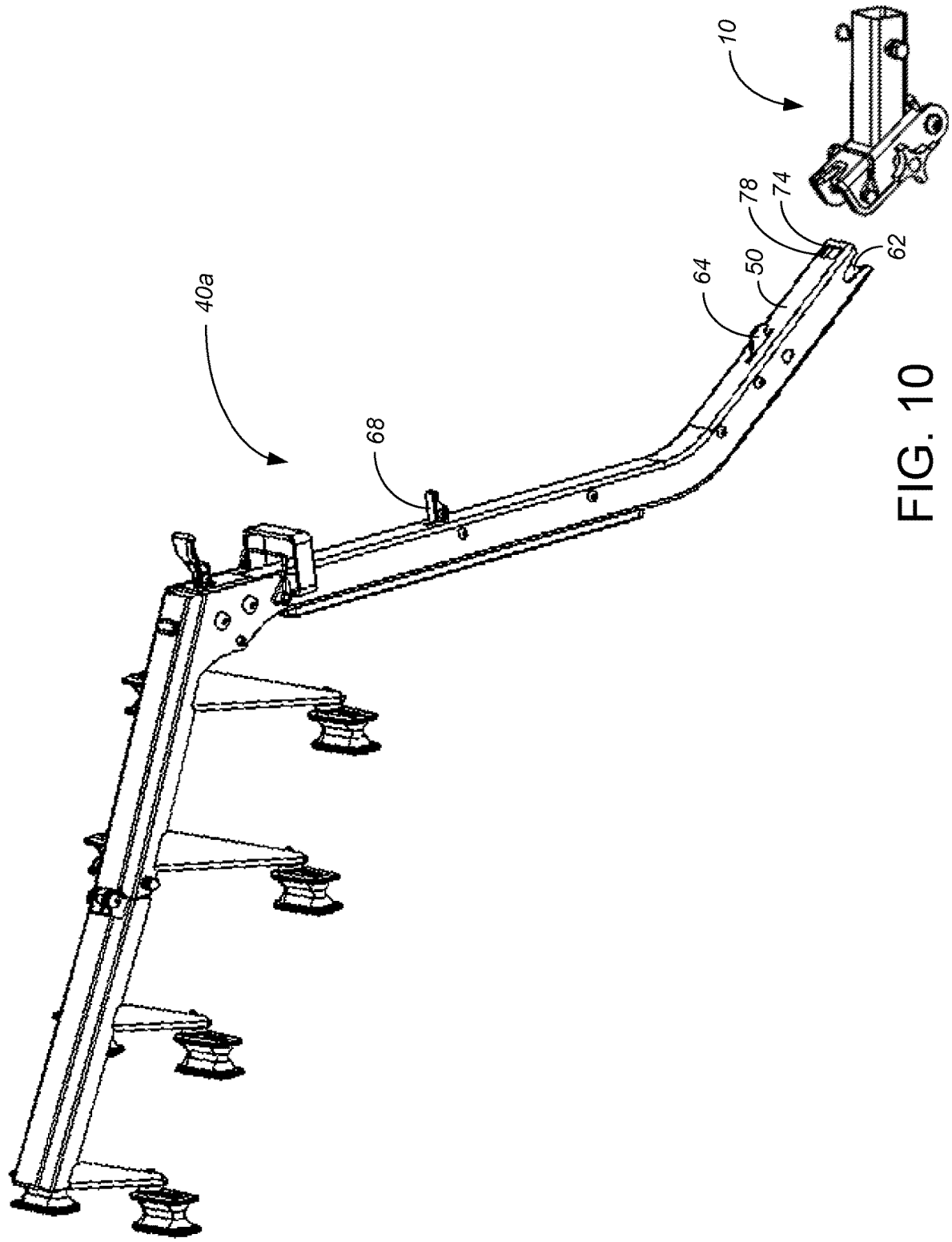
FIG. 10 is a perspective view, from the upper-front-right, showing the quick mount adapter of FIG. 1-6 relative to a bike rack accessory which can be secured to a receiver tube using the quick mount adapter of the present invention.
Figure 11:
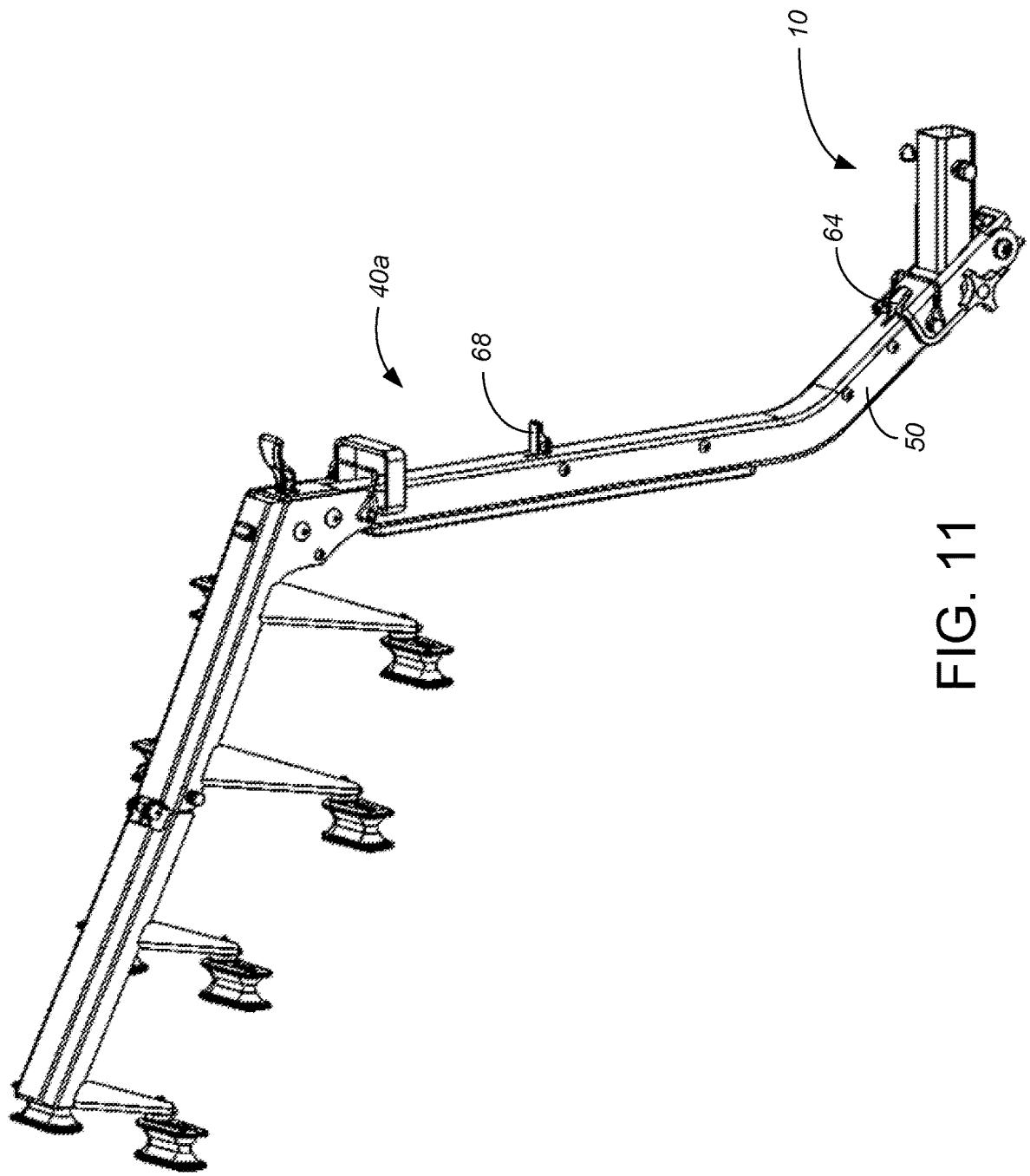
FIG. 11 is a perspective view, from the upper-front-right, showing the quick mount adapter of FIG. 1-6 in use in attaching and supporting the bike rack accessory.

The usage of the quick mount of the present invention will be further understood with regard to the example of a bike rack 40a shown in FIGS. 10 and 11. During use, the bike rack 40a extends horizontally behind the towing vehicle for a significant distance, and also extends upwardly above the receiver tube 12 by a significant distance. The latch 64 preferably has a latch handle 68 which can be released to move the latch 64 upwardly in the direction of the accessory shank axis 72. Pulling the hitch pin 48 and then releasing the latch handle 68 (no tools required) allows the bike rack 40a to be laid down, giving more access to the rear of the towing vehicle (such as through a tailgate, hatchback or trunk of the towing vehicle). When the user is finished accessing the rear of the towing vehicle, the accessory 40a then can be merely rotated upward back to its towing position, pivoting about the pivot bolt 36, with the hitch pin 48 thereafter reinserted. This pivoting type of motion (with no tools, and supporting no substantial weight) was not available with prior art accessories.

Figure 12:
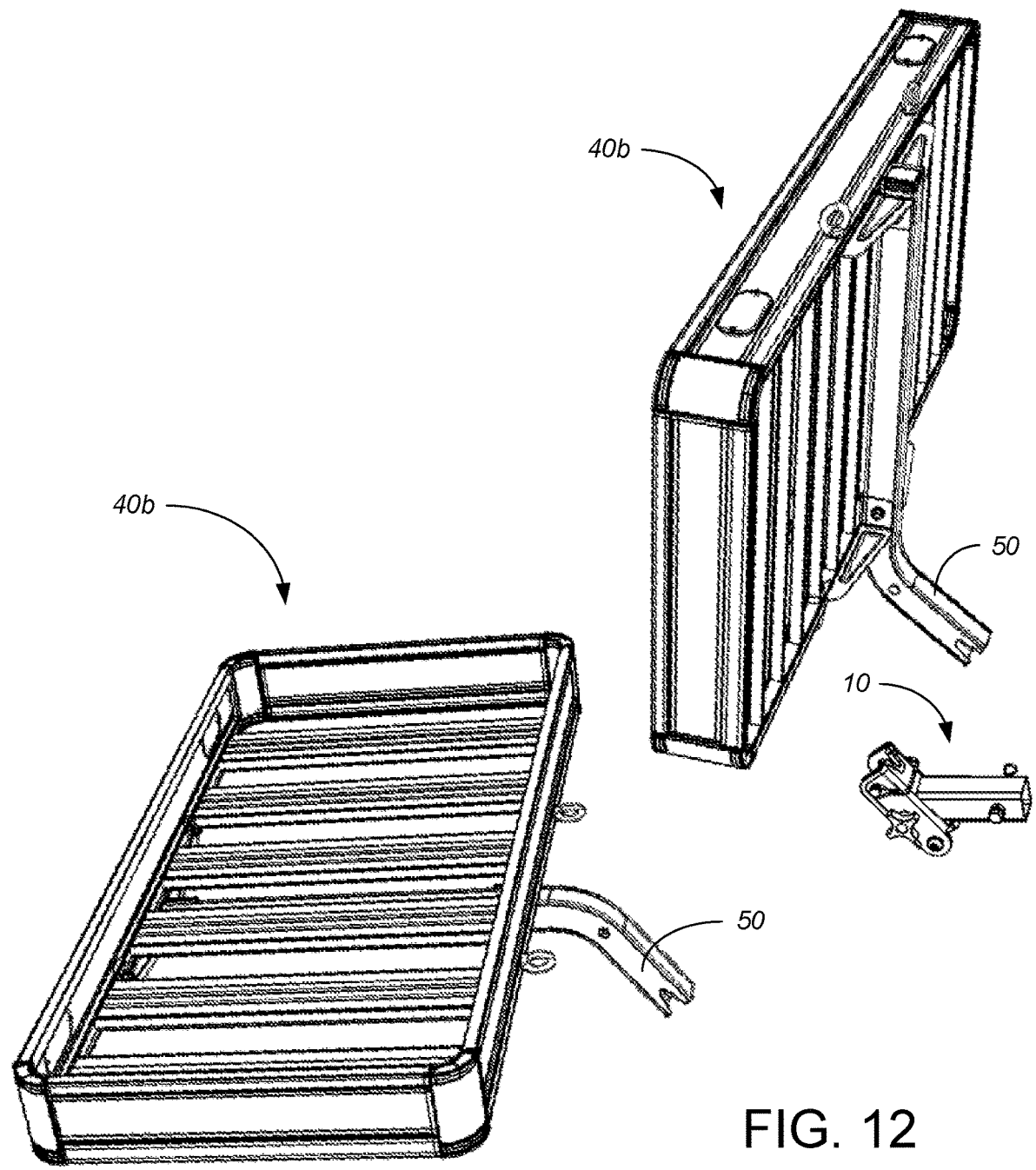
FIG. 12 is a perspective view, from the upper-front-right, showing the quick mount adapter of FIG. 1-6 relative to two possible orientations (a use orientation and a stowage orientation) of a cargo tray accessory.

Another usage is shown in FIG. 12 where the associated accessory is a cargo platform or shelf 40b. The cargo platform 40b has a usage position (depicted in FIG. 12 at lower left), where the plane defined by the cargo platform 40b extends horizontally at an elevation several inches above the receiver tube 12. The accessory 40b may be flipped over/inverted to a storage position (depicted in FIG. 12 at upper right), and reinstalled relative to the quick mount adapter 10. To do so, the user first withdraws the securing hitch pin 48 and raises the accessory 40b out of the adapter 10, turns the accessory 40b 180° about the accessory shank axis 72 from the accessory usage orientation to the accessory storage orientation, relowers the towing accessory 40b relative to the channel structure 24, and then refastens the securing hitch pin 48. This flipping between two orientations is possible because the insert end (and particularly the support recess 62 and the securing connector holes 70) is symmetrical about a transverse cut plane through the shank axis 72. The insert end of the accessory shank 50 can be placed downwardly onto the pivot bar 36 in either of two support orientations, with the securing hitch pin 48 positioned through the aligned holes 52, 70 to align and maintain the accessory shank axis 72 coincident with the channel axis 28 in either of the two support orientations. Because of the 54° angle θ relative to horizontal in the preferred embodiment, the storage position reorients the accessory 40 so the significant horizontal distance of the cargo platform during use now projects mostly vertically, but also 18° forwardly relative to vertical (54°+54° results in a 108° change between the two accessory orientations). As another example, a quick mount adapter which used an angle θ of 45° could change an accessory orientation from straight horizontal to straight vertical. This type of change, by flipping the accessory 40 over between usage and storage positions, was generally not available with prior art accessories (other than mounting the accessory 180° upside down in the receiver tube 12).

The present invention thus allows a host of interchangeable towable accessories to be efficiently mounted, laid down, stored and/or removed. It will be understood that, instead of a bike rack 40a or cargo platform 40b, the quick mount connection of the present invention could be used with any other type of accessory, including balls, ball mounts and any of the accessories discussed in the Background section above, just by similarly modifying their shank using the angle θ and appropriately positioned support recesses 62 and openings 70.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

The invention claimed is:

1. A quick mount hitch connection for supporting a towing accessory from a towing vehicle, comprising:
a channel structure with side walls defining a channel with a channel axis, the channel structure being adapted to be mounted on a towing vehicle so the channel axis is sloped relative to both vertical and horizontal, the channel structure having an open face;
a pivot bar supported by the side walls and extending into the channel;
an accessory shank of a towing accessory defining an accessory shank axis, the accessory shank having an insert end sized to be received within the channel, the insert end defining at least one support recess which can be placed downwardly onto the pivot bar so the pivot bar supports the weight of the towing accessory while still permitting pivoting of the accessory shank through the open face; and
a securing connector, which can be removably fastened between the side walls of the channel structure at a location spaced from the pivot bar, so as to retain the pivot bar within the support recess and simultaneously align and maintain the accessory shank axis coincident with the channel axis.

2. The quick mount hitch connection of claim 1, wherein the channel axis is sloped rearwardly and upwardly;
wherein the side walls comprise a right side wall, a left side wall and a top side wall, with the open face being open downwardly and rearwardly; and
wherein the pivot bar extends from the right side wall to the left side wall.

3. The quick mount hitch connection of claim 2, wherein the accessory shank is a rectangular tubular structure.

4. The quick mount hitch connection of claim 1, wherein the securing connector is a securing pin, wherein the side walls comprise securing pin holes, and wherein the accessory shank comprises a securing pin through hole which can be aligned with the securing pin holes of the side walls while the support recess is in contact with the pivot bar, such that inserting the securing pin through the aligned securing pin holes and securing pin through hole retains the pivot bar within the support recess and simultaneously aligns and maintains the accessory shank axis coincident with the channel axis.

5. The quick mount hitch connection of claim 1, further comprising a connector shank adapted to be received by generally horizontal sliding within a receiver tube of a towing vehicle hitch, the connector shank defining a connector shank axis, wherein the channel axis is sloped at an angle in the range of 30 to 60° relative to the connector shank axis.

6. The quick mount hitch connection of claim 1, wherein the side walls and the accessory shank are formed of metal, and further comprising:
at least one insert formed of a plastic material within the channel and separating the accessory shank from the side walls so as to prevent metal to metal contact between the channel structure and the accessory shank.

7. The quick mount hitch connection of claim 1, wherein the towing accessory comprises a latch on the accessory shank, which latch releasably mates with the channel structure to prevent the accessory shank from rotating downwardly about the pivot bar under a gravitational force before the securing connector is positioned in place, the latch having a latch handle which can be released to allow the accessory shank to rotate downwardly about the pivot bar while the securing connector is not in use.

8. The quick mount hitch connection of claim 1, further comprising a stop on the accessory shank which limits a range of gravitational pivoting of the accessory shank with respect to the channel structure while the securing connector is not in use.

9. The quick mount hitch connection of claim 8, wherein the stop defines a gravitationally lowered angle of the accessory shank, and wherein the stop interferes with the channel structure to prevent removal of the accessory shank out of the channel while at the gravitationally lowered angle.

10. The quick mount hitch connection of claim 1, further comprising an anti-rattle screw threaded through a side wall of the channel structure, which anti-rattle screw can be tightened while the accessory shank is within the channel to minimize rattling of the accessory shank against the side walls of the channel structure.

11. The quick mount hitch connection of claim 1, wherein the insert end can be placed downwardly onto the pivot bar in either of two orientations, and wherein the securing connector can align and maintain the accessory shank axis coincident with the channel axis in either of the two orientations.

12. A quick mount hitch connection for supporting a towing accessory from a towing vehicle, comprising:
    a channel structure with side walls defining a channel with a channel axis, the channel structure having an open face;
    a shank defining a shank axis, the shank having an insert end sized to be received within the channel;
    a pivot bearing defining a pivot axis at a lower end of the channel and a lower end of the shank while the shank is within the channel, the pivot axis extending transversely relative to the channel axis, the pivot bearing allowing relative pivoting movement between the shank and the channel structure about the pivot axis, between a first rest position where the shank axis is coincident with the channel axis while the quick mount hitch connection supports the towing accessory from the towing vehicle and a second rest position with the shank extending through the open face while the quick mount hitch connection supports the towing accessory from the towing vehicle; and
    a securing connector, at a location spaced from the pivot bearing, which can be fastened so as to retain the shank within the channel structure and simultaneously align and maintain the accessory shank axis coincident with the channel axis.

13. The quick mount hitch connection of claim 12, further comprising a stop which limits a range of gravitational pivoting of the shank with respect to the channel structure while the securing connector is not in use, wherein the stop defines a gravitationally lowered maximum angle between the shank axis and the channel axis, and wherein the stop interferes to prevent removal of the shank out of the channel while at the gravitationally lowered maximum angle.

14. The quick mount hitch connection of claim 12, further comprising a releasable latch which, when latched with the shank within the channel, prevents downward rotational movement between the shank and the channel structure, the latch having a latch handle which can be released to allow the downward rotational movement between the shank and the channel structure while the securing connector is not fastened.

15. The quick mount hitch connection of claim 12, wherein the shank is provided on the towing accessory, and wherein the channel is provided on a towing adapter, the towing adapter further comprising an adapter shank shaped to be received by generally horizontal sliding within a receiver tube of a towing vehicle hitch, the adapter shank defining an adapter shank axis, wherein the channel axis is sloped at an angle in the range of 30 to 60° relative to the adapter shank axis.

16. The quick mount hitch connection of claim 15, wherein the insert end can be placed downwardly onto the pivot bearing in either of two orientations, and wherein the securing connector can align and maintain the shank axis coincident with the channel axis in either of the two orientations, one orientation being a usage orientation of the towing accessory and the other orientation being a storage orientation of the towing accessory.

17. A method of attaching a towing accessory to a towing vehicle, comprising:
    securing a channel structure to the towing vehicle, the channel structure having side walls defining a channel with a channel axis, the channel axis being sloped relative to both vertical and horizontal on the towing vehicle, the channel structure having an open face;
    lowering a towing accessory relative to the channel structure, the towing accessory having an accessory shank with an accessory shank axis and an insert end sized to be received within the channel, the lowering act moving the insert end from a position outside the channel to a location within the channel such that the insert end is pivotally supported with the accessory shank at least partially within the channel while still permitting pivoting of the accessory shank through the open face and about a pivot axis which is transverse to the channel axis; and
    fastening a removable securing connector, at a location spaced from the pivot axis, so as to retain the accessory shank within the channel and simultaneously align and maintain the accessory shank axis coincident with the channel axis.

18. The method of claim 17, further comprising:
    after lowering the towing accessory into a pivotal support position and before fastening the removable securing connector, pivoting the towing accessory upwardly about the pivot axis until a latch holds the towing accessory in position under its gravitational weight with the accessory shank axis coincident with the channel axis.

19. The method of claim 17, further comprising:
    removing the removable securing connector;
    reorienting the towing accessory by pulling the towing accessory upwardly out of the channel, turning the towing accessory 180° about the accessory shank axis from an accessory usage orientation to an accessory storage orientation, and relowering the towing accessory relative to the channel structure; and
    refastening the removable securing connector, so as to retain the accessory shank within the channel and simultaneously align and maintain the accessory shank axis coincident with the channel axis, thereby supporting the towing accessory from the towing vehicle in the accessory storage orientation.

20. The method of claim 17, further comprising:
    removing the removable securing connector;
    while the towing vehicle is at rest, pivoting the accessory shank downwardly about the pivot axis until a stop limits a range of gravitational pivoting of the accessory shank with respect to the channel structure at a tailgate access position;
    pivoting the accessory shank upwardly about the pivot axis back to an accessory usage position; and
    refastening the removable securing connector, so as to retain the accessory shank within the channel and simultaneously align and maintain the accessory shank axis coincident with the channel axis at the accessory usage position.

\* \* \* \* \*